United States Patent [19]

Takata et al.

[11] Patent Number: 4,644,242
[45] Date of Patent: Feb. 17, 1987

[54] CONTROLLING SYSTEM FOR A POLE CHANGE ELECTRIC MOTOR

[75] Inventors: Nobuharu Takata; Kohji Kurita, both of Hyogo, Japan

[73] Assignee: Mitsubishi Denki Kabushiki Kaisha, Tokyo, Japan

[21] Appl. No.: 635,344

[22] Filed: Jul. 27, 1984

[30] Foreign Application Priority Data

Jul. 30, 1983 [JP] Japan .................................. 58-139572

[51] Int. Cl.⁴ ............................................. H02P 7/48
[52] U.S. Cl. .................................... 318/771; 318/773
[58] Field of Search ................................. 318/771, 773

[56] References Cited

U.S. PATENT DOCUMENTS

| | | | |
|---|---|---|---|
| 1,549,698 | 8/1925 | Williams | 318/771 |
| 1,719,889 | 7/1929 | Kelsey | 318/773 |
| 1,875,263 | 8/1932 | Richter | 318/771 |
| 1,927,208 | 9/1933 | Gay | 318/771 |
| 1,995,157 | 3/1935 | Riggs | 318/771 |
| 2,785,511 | 3/1957 | Wilson | 318/771 |
| 4,481,781 | 11/1984 | Tsukamoto | 318/773 |

Primary Examiner—David Smith, Jr.
Attorney, Agent, or Firm—Bernard, Rothwell & Brown

[57] ABSTRACT

A controlling system for a pole change electric motor of the type wherein the polarity of electric currents flowing through some of stator windings is changed to change the number of poles thereby to vary the rotational frequency of the motor. The system comprises a reactor which is connected, during running of the motor at a high speed, in series to a power circuit for supplying power to the motor, whereby the motor is driven by way of the reactor when the motor is changed over from a low to a high speed running.

1 Claim, 4 Drawing Figures

CONTROLLING SYSTEM FOR A POLE CHANGE ELECTRIC MOTOR

BACKGROUND OF THE INVENTION

1. Field of the Invention

This invention relates to a pole change electric motor (PAM), and more particularly to a controlling system for changing the number of poles of a pole change electric motor to vary the rotational frequency of the motor.

2. Description of the Prior Art

Generally, the number (n) of an electric motor is represented by a following expression $$n = \frac{120 \cdot f}{p} \text{ [rpm]}$$

where f is the frequency of a power source, and p is the number of poles. As can be seen from the expression, the rotational frequency (n) of an electric motor can be varied by changing the number of its poles. A pole change electric motor to which the present invention is directed makes positive use of this feature.

Electric motors of this type are used for applications wherein a load thereto varies: for example, a boiler forcing fan connected to an electric motor may run under a full load in the daytime and under a low load at night, and in such a case, from a point of view of saving power, the electric motor may be run, at night, in a lower rotational frequency (with an increased number of poles) in accordance with a low load, and in the daytime, it may be run in an increased rotational frequency (with a reduced number of poles) in accordance with a heavy load.

Now, a principle of such a pole change electric motor (hereinafter referred to as "PAM") will be described in more detail with reference to FIGS. 1A and 1B and FIG. 2.

FIGS. 1A and 1B illustrate relations between stator windings of a PAM and poles of a rotating magnetic field, and in those figures, reference symbols 1a, 1b, 2a, 2b, 3a, 3b, 4a, and 4b designate each a stator winding (modelled for one phase), and reference symbol 5 designates a pole (indicated by N or S) of a rotating magnetic field.

FIG. 2 illustrates a conventional pole change system for a PAM, and in this figure, reference symbol 6 designates stator windings of the PAM including windings 61a, 61b, 62a, 62b, 63a and 63b and having terminals $U_1$, $U_2$, $V_1$, $W_2$, $W_1$ and $V_2$, respectively. Reference symbols 7, 8 and 9 denote each a switch, $V_R$, $V_S$ and $V_T$ denote power supply voltages of R, S and T phases of a three-phase power source, respectively, and reference symbol O designates a neutral point of the three-phase voltages.

It is to be noted that FIG. 1A is a diagrammatic representation, in a modelled form, of a pole change electric motor having four poles therein while the motor is used as an electric motor having six poles therein by reversing the polarity of electric currents flowing through the coils 2b, 3a, 3b and 4a which are shown in broken lines in FIG. 1B. If description is given by way of an example of an electric current of the R phase, the coil 61b of FIG. 2 is connected between the terminal $U_2$ and the neutral point and the direction of the electric current flowing therethrough does not change after changing of the number of poles. Accordingly, the coil 61b corresponds to the coil 1a, 1b, 2a or 4b of FIGS. 1A and 1B. On the other hand, the coil 61a is connected between the terminals $U_1$ and $U_2$ and the direction of the electric current flowing therethrough changes after changing of the number of poles. Accordingly, the coil 61a corresponds to the coil 2a, 3a, 3b or 4a of FIGS. 1A and 1B. In this way, a PAM wherein the number of poles can be changed can be obtained by changing connections of some of its stator windings to change coil currents. While FIGS. 1A and 1B illustrate an example wherein the polarity of electric currents is changed, the polarity may otherwise be changed by changing phase currents or the polarity of the same.

Referring again to FIG. 2, the PAM motor is run at a low speed with the switch 7 closed and with the switches 8 and 9 opened, and on the contrary, it is run at a high speed with the switch 7 open and with the switches 8 and 9 closed to change the electric currents flowing through the stator windings 6 thereby to change the number of poles of the motor. However, with the conventional circuitry construction, if the switches 7, 8 and 9 are operated to change the number of poles in order to change over the motor from a low to a high speed running, the rotational frequency of the PAM motor will increase suddenly from a low speed to a high speed; such a sudden increase may be undesirable for some types of loads. For example, where a load to the motor is a forcing fan for a boiler, because a controlling speed for reducing an air flow by a vane or damper (hereinafter referred to only as a vane) mounted on the fan is slow, it cannot follow an increasing speed of an air flow due to such an increase of the rotational frequency of the motor, and as a result, the amount of air forced into the boiler is increased suddenly, resulting in sudden rise of the internal pressure of the boiler which may lead to explosion or misfiring of the boiler.

SUMMARY OF THE INVENTION

It is a principal object of the present invention to provide a controlling system for a pole change electric motor which can control the acceleration of the motor to prevent an inadvertent accident from occurring when the speed of the motor is changed over from a low speed to a high speed.

In order to attain this object, according to a principle of the invention, there is provided a controlling system for a pole change electric motor of the type wherein the polarity of electric currents flowing through some of stator windings is changed to change the number of poles thereby to vary the rotational frequency of the motor, which system comprises a reactor which is connected, during running of the motor at a high speed, in series to a power circuit for supplying power to the motor, whereby the motor is driven by way of the reactor when the motor is changed over from a low to a high speed running.

BRIEF DESCRIPTION OF THE PREFERRED EMBODIMENTS

Figure 1A:
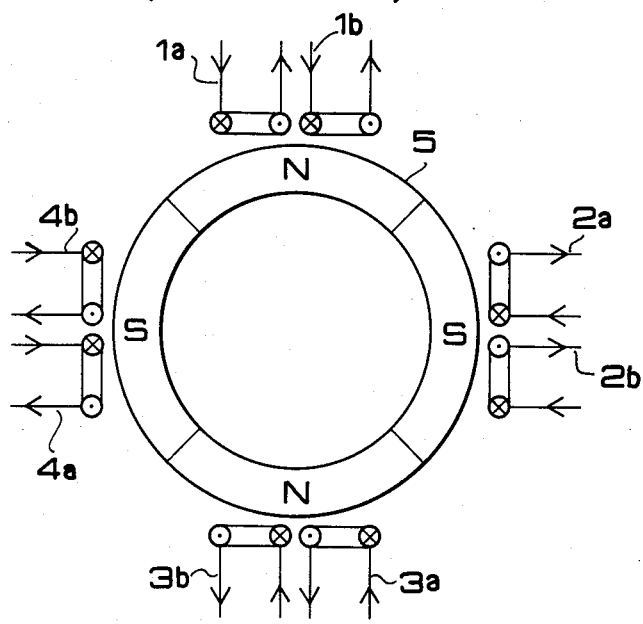
FIGS. 1A and 1B are diagrammatic representations illustrating a principle of a pole change electric motor.
Figure 1B:
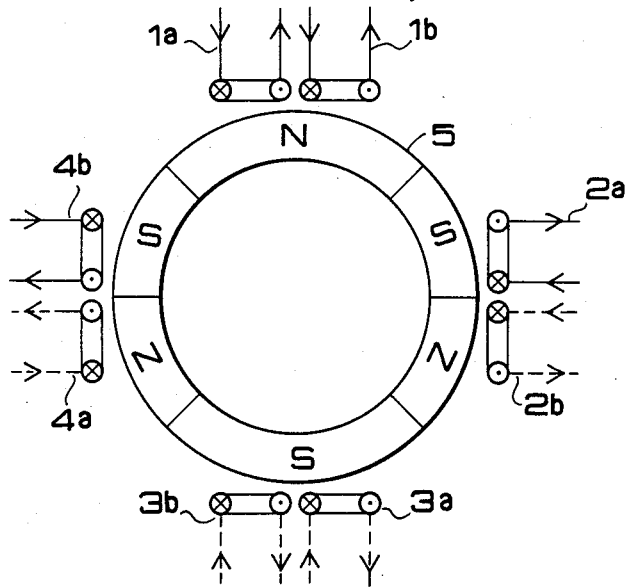
Figure 2:
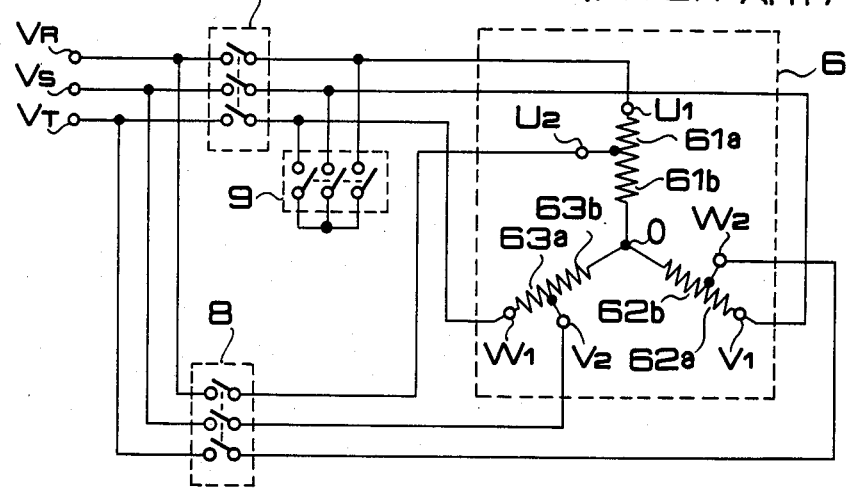
FIG. 2 is a circuit diagram illustrating a conventional controlling system for a pole change electric motor.
Figure 3:
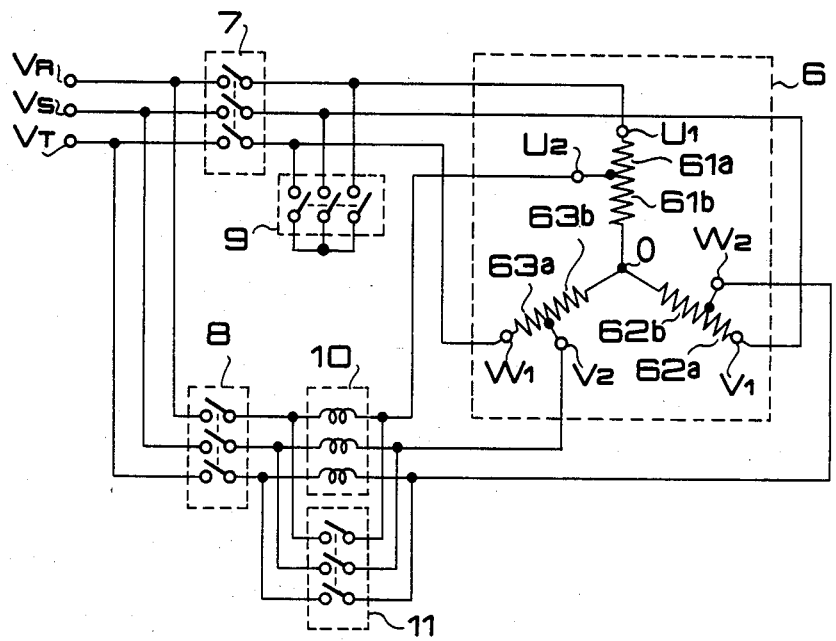
FIG. 3 is a circuit diagram showing an embodiment of a controlling system for a pole change electric motor according to the present invention.

An embodiment of the present invention will now be described with reference to the drawings. Referring to FIG. 3, like reference numerals designate like parts to those of FIG. 2, and reference numeral 10 designates a reactor, and 11 a switch.

It is assumed that, by the system of FIG. 3, the motor is run in similar conditions to those by the system of FIG. 2 as indicated below:

during running at a low speed, the switch 7 is closed and the switches 8 and 9 are open (the switch 11 is open), and during running at a high speed, the switch 7 is open and the switches 8 and 9 are closed (the switch 11 is closed).

The system of FIG. 3 is constituted such that, when the motor is changed over from a low to a high speed running, the switch 11 is changed over from an open to a closed condition after lapse of a predetermined period of time.

Accordingly, when the motor is changed over from a low to a high speed running by the system of FIG. 3, the reactor 10 is thrown in for the predetermined period of time so that supply of power to the motor is controlled for the predetermined period of time after the changing over of the motor to thus control the increasing ratio of the speed (ratio of acceleration) of the motor. Where a boiler forcing fan as mentioned hereinabove is a load to the motor, an increase of an air flow due to acceleration of the motor is selected to be substantially the same as a decrease of an air flow due to throttling of a vane of the fan.

With the arrangement thus set, an air flow forced into the boiler does not present a sudden increase, and hence the motor can be changed over from a low to a high speed running in safety.

After changing over to a high speed running, the function of the reactor 10 is completed, and in order to prevent loss of power by the reactor 10, the reactor 10 is short-circuited by means of the switch 11.

As apparent from the foregoing description, according to the present invention, when a PAM motor is changed over from a low to a high speed running, power is supplied to the PAM motor by way of a reactor, and accordingly, the system of the invention presents an effect to control the acceleration of the motor to the high speed.

What is claimed is:

1. In combination with a pole change electric motor system including a pair of stator windings, first switch means for connecting the pair of stator windings in series with each other across a power source with orientation so as to form four poles for low speed operation, and second switch means for connecting the pair of stator windings in parallel with each other across the power source with orientation so as to form two poles for high speed operation; an improvement comprising a reactor connected in series with the second switch means and the power source so that an impedance is provided in a circuit supplying power to the motor when the operation of the motor is switched from low speed to high speed operation in order to control acceleration of the motor during transition from low speed to high speed, and third switch means connected in parallel with said reactor for shunting the reactor after a predetermined period of time to allow said motor to operate at full power at said high speed.

* * * * *